United States Patent

Strunk

[19]

[11] Patent Number: 6,127,791
[45] Date of Patent: Oct. 3, 2000

[54] ELECTRIC DRIVE SYSTEM AND METHOD

[76] Inventor: Timothy L. Strunk, 1864 Farmview Dr., Lexington, Ky. 40515

[21] Appl. No.: 08/922,255

[22] Filed: Sep. 2, 1997

Related U.S. Application Data

[63] Continuation of application No. 08/530,043, Sep. 19, 1995, abandoned.

[51] Int. Cl.[7] .................................................. H02K 23/08
[52] U.S. Cl. .......................... 318/252; 318/139; 318/527; 388/905; 388/801; 388/806
[58] Field of Search ..................................... 318/246–252, 318/139, 432–434, 521, 523; 388/905, 806, 801, 803–805

[56] References Cited

U.S. PATENT DOCUMENTS

| | | | |
|---|---|---|---|
| 468,128 | 2/1892 | Blackwell | 318/252 |
| 1,063,608 | 6/1913 | Shaw et al. | 318/252 |
| 3,283,227 | 11/1966 | Ulinski | 318/252 |
| 3,348,111 | 10/1967 | Woehler | 318/252 |
| 3,656,038 | 4/1972 | Ries et al. | 318/139 |
| 3,678,357 | 7/1972 | Swanke et al. | 318/252 |
| 4,471,277 | 9/1984 | Franz, Jr. | 318/376 |
| 4,935,478 | 6/1990 | Houst | |
| 4,935,678 | 6/1990 | Houst | 318/252 |
| 5,164,642 | 11/1992 | Ashiya | 318/139 |

*Primary Examiner*—David Martin
*Attorney, Agent, or Firm*—King and Schuckli, PLLC

[57] ABSTRACT

An integrated transmission is effectively achieved within a series-excited motor by varying the number of winding turns in the field coil in relation to the speed-torque demand on the motor. At low motor speed, all of the field winding is engaged to produce the maximum available electromagnetic field, thereby increasing the motor's available torque and efficiency. When there is a high torque demand at high speed, only a portion of the field winding is engaged so that a reduced electromagnetic field is produced, thereby allowing a higher current in the motor, thereby allowing a higher torque to be produced. Thus the series motor with integrated transmission will have the same speed-torque characteristics as a system with a series motor and a conventional transmission. The integrated transmission can be implemented with relatively inexpensive relays and, if desired, by adding additional winding turns in the series field. The advantage of the integrated transmission is that it is less costly than and eliminates the weight of a separate transmission, which are important in applications like electric vehicles.

13 Claims, 6 Drawing Sheets

ELECTRIC DRIVE SYSTEM AND METHOD

This is a continuation of application Ser. No. 08/530,043, filed Sep. 19, 1995, now abandoned.

BACKGROUND—FIELD OF INVENTION

This invention relates to a novel electric drive system, electric motor and method of controlling an electric motor.

BACKGROUND OF THE INVENTION

The common method used in specifying a series-excited DC motor for a particular application is to select a torque constant (K) so that acceptable, yet compromised, torque is developed over the speed range at which the motor is expected to operate. If this compromised operation is not satisfactory, a conventional transmission is added. For the purpose of a direct comparison with the present invention, the case in which a transmission is required for an electric vehicle is discussed.

A conventional drive system for an electric vehicle is shown in FIG. 1. Its primary elements are battery 10, converter 11, motor 12, transmission 13, differential 14, axle 15, wheels 16, and controller 17. The converter 11 transfers electrical power from the battery 10 to the motor 12 at a certain voltage as called for by the controller 17. The motor 12 converts electrical power into mechanical power. The transmission 13 transfers mechanical power from the motor 12 to the differential 14 at a gear ratio called for by the controller 17. The response time for transmission 13 to change gears is determined by the mechanical time-constant of the motor 12 and transmission 13. The differential 14 has an appropriate gear ratio in accordance with the diameter of wheels 16 so that appropriate vehicle speed is obtained.

The controller 17 senses differential input speed through tachometer 21 and motor 12 current through current probe 20.

The series-excited DC motor 12 has the characteristic that the field winding 1 and armature winding 3 are in series. The battery 10, converter 11, controller 17, transmission 13, axle 15, and wheels 16 are common devices which are understood by those skilled in the art and are therefore not discussed in detail here.

For the purpose of discussion, assume that the motor 12 has the constant parameters listed in Table 1 and the variable parameters listed in Table 2. To simplify the discussion it is assumed that the motor 12 does not have a maximum speed limit.

TABLE 1

Constant Parameters

| Symbol | Name | Value | Units |
|--------|------|-------|-------|
| K | Torque constant | 0.00057 | (volt-sec)/(amp-rad) |
| Rf | Field resistance | 0.014 | ohm |
| Ra | Armature resistance | 0.014 | ohm |
| Imax | Maximum current | 360 | amp |
| Vcc | Battery voltage | 48 | volts |

TABLE 2

Variable Parameters

| Symbol | Name | Units |
|--------|------|-------|
| W | Rotational speed of motor | rad/sec |
| I | Motor current | amp |
| V | Motor terminal voltage | volts |
| T | Torque developed by motor | Newton-meter (N-m) |
| Eff | Motor efficiency | % |

The equations describing the operation of the series-DC motor 12 at steady state are given in Eqs. 1 through 3.

$$V = I*(Rf+Ra)+I*K*w \quad (1)$$

$$T = K*I*I \quad (2)$$

$$Eff = (100*W*K)/(W*K+Rf+Ra) \quad (3)$$

If we use the values from table 1 and Eqs. 1 through 3, the resulting maximum values for I, V, T, and Eff are shown in Table 3 for several values of W.

TABLE 3

Maximum Value of Variable Parameters vs Motor Speed

| W | I | V | T | Eff | Comments |
|---|---|---|---|-----|----------|
| 0 | 360 | 10 | 74 | 0 | I at limit |
| 50 | 360 | 20 | 74 | 50 | I at limit |
| 105 | 360 | 32 | 74 | 68 | I at limit |
| 185 | 360 | 48 | 74 | 79 | I and V at limit |
| 210 | 325 | 48 | 60 | 81 | V at limit |
| 315 | 230 | 48 | 30 | 87 | V at limit |
| 420 | 180 | 48 | 19 | 90 | V at limit |
| 525 | 144 | 48 | 12 | 91 | V at limit |
| 788 | 105 | 48 | 6 | 94 | V at limit |

The torque developed by the motor 12 is limited at low speeds by the current that both the converter 11 and the motor 12 can sustain without overheating, which in this case is 360 amp. Therefore, when the motor 12 is not rotating (W=0), no more than 10 volts can be applied to the motor 12, and up to 74 N-m of torque will be produced with zero efficiency. As the motor 12 begins to speed up, it will reach a point at which both the current and the voltage are at their limits, which occurs at 185 rad/sec in this case. Now full voltage can be applied to motor 12, and up to 74 N-m of torque can be produced at 79% efficiency. If the load demand at 185 rad/sec is less than 74 N-m, an appropriate lower voltage will be applied to the motor 12 to meet that demand. However, at 185 rad/sec the maximum torque that can be developed is 74 N-m, so any demand over that amount will be only partially met. At speeds higher than 185 rad/sec, the developed torque is limited by the voltage level of the battery 10, which is 48 volts in this case. Since the voltage to the motor 12 terminals cannot be increased further, the current drops with increasing speed because of the increasing induced armature voltage.

The transmission 13 has three gears; low, nominal, and high. The nominal gear has a one-to-one ratio of motor speed to differential input speed. If the transmission 13 were not part of the system, the vehicle would always be in "nominal" gear. The differential input speed (Wd) relative to the motor speed (W) is given in Eqs. 4 through 6 for low gear, nominal gear, and high gear, respectively.

| | | |
|---|---|---|
| Low gear: | Wd = 0.67 * W | (4) |
| Nominal gear: | Wd = W | (5) |
| High gear: | Wd = 2.0 * W | (6) |

The torque (Td) delivered to the differential 14 is given in Eqs. 7 through 9 for low gear, nominal gear, and high gear, respectively.

| | | |
|---|---|---|
| Low gear: | Td = 1.5 * T | (7) |
| Nominal gear: | Td = T | (8) |
| High gear: | Td = 0.5 * T | (9) |

If we use the values from Table 3 and Eqs. 4 through 9, the maximum torque (Td) that can be delivered to differential 14 at a given differential input speed (Wd) is graphed in FIG. 2 for each of the three gears. Notice that low gear allows a much higher torque to be delivered to the differential 14 at low speeds. However, low gear does not allow as much torque to be delivered to the differential 14 at high speeds. High gear allows more torque to be delivered at high speeds but severely limits the delivered torque at low speeds. Therefore it is apparent that the transmission 13 is needed so that a greater maximum torque can be delivered to the differential 14 over the entire speed range.

The efficiency of motor 12 can be calculated from Table 3 and Eqs. 4 through 9 and is graphed in FIG. 3 for each of the three gears. Notice that low gear is the most efficient and high gear is the least efficient over the entire speed range.

Taking the speed-torque characteristics of the system from FIG. 2. and the efficiency characteristics from FIG. 3. leads to the following operating rules that the controller 17 should follow:

(1) For the entire speed range of the system, if low gear can deliver the torque required, use low gear since it is the most efficient.

(2) For speeds at which nominal gear can deliver more torque than low gear, use nominal gear when low gear cannot deliver enough torque.

(3) For speeds at which high gear can deliver more torque than nominal gear, use high gear when nominal gear cannot deliver enough torque.

The disadvantage of the conventional method illustrated is that a separate transmission is required to maximize the torque that is delivered to the vehicle.

SUMMARY OF THE PRESENT INVENTION

Accordingly, several objects and advantages of the present invention are:

(1) A separate conventional transmission is not required.

(2) The function of the transmission is integrated into the stator winding of the motor.

(3) The cost, size, weight, and maintenance of a motor with integrated transmission is much less than for a conventional motor-transmission set.

(4) The environment is better served by the motor with integrated transmission since it does not require a hydraulic fluid that must be periodically replaced as does the conventional transmission.

(5) The integrated transmission will provide a smoother ride for the vehicle's passengers since a change in motor speed is not required as the gear is changed as occurs with a conventional transmission.

In accordance with these objects, an electric drive system is disclosed for driving an apparatus. The electric drive system includes a battery, an electric motor having first and second field windings and an armature winding, a means for selectively controlling current flow through the field windings and a differential for transferring power from said electric motor to the apparatus to be driven.

In accordance with a further aspect of the invention an electric motor includes first and second field windings, an armature winding, and means for selectively controlling current flow through the field windings in response to speed-torque demand on the electric motor.

In accordance with yet another aspect of this invention, a method for providing an electric motor with an integrated transmission generally includes the steps of sensing electric motor current, sensing motor output shaft speed and dynamically varying the length of the variable length field winding used to create a magnetic field in response to speed-torque demand on the electric motor.

DRAWING FIGURES

The prime numbers for the novel system indicate that these elements are different from their counterparts in the conventional system.

DETAILED DESCRIPTION OF PRESENT INVENTION

Figure 1:
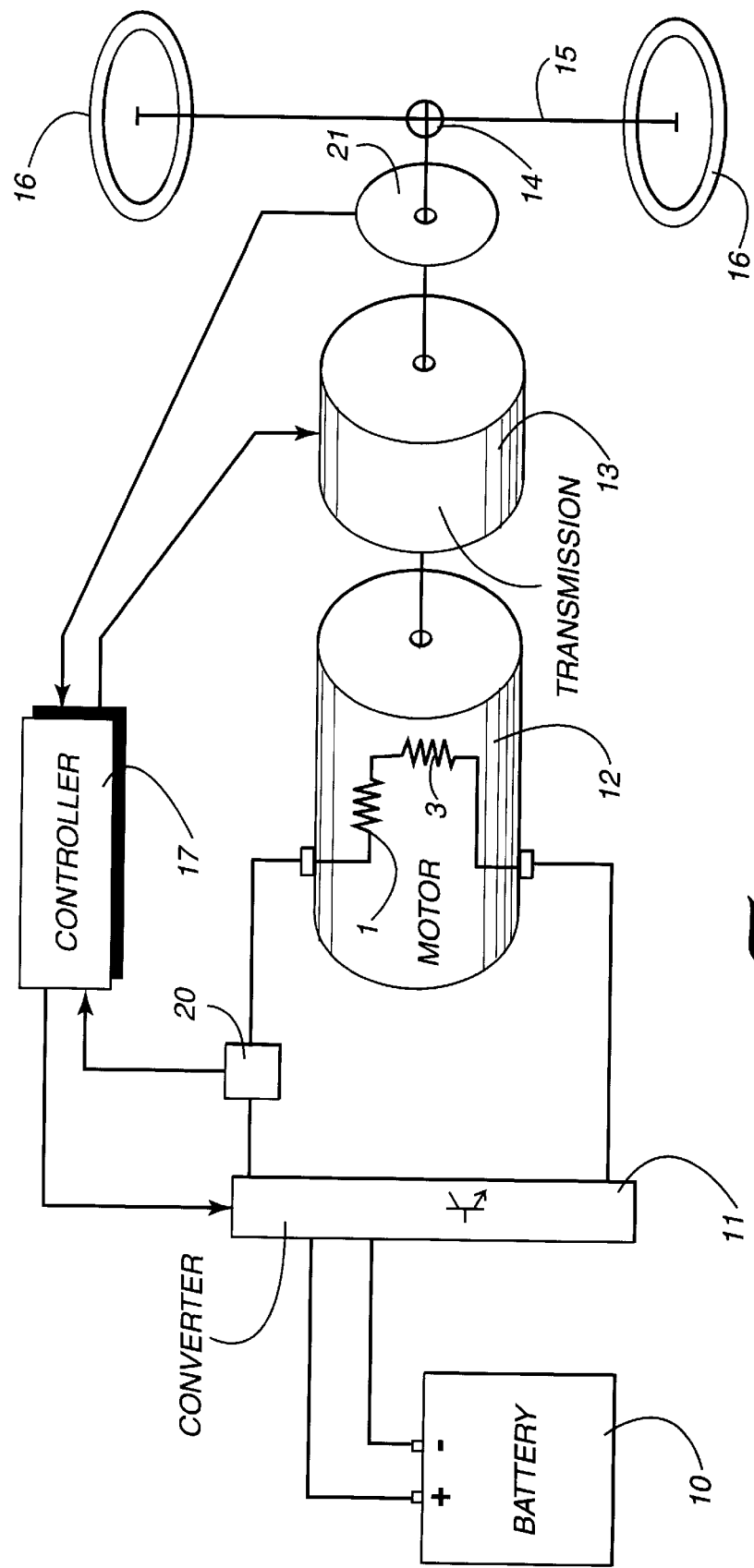
FIG. 1 shows a conventional electric vehicle drive system with series-excited DC motor and separate transmission.
Figure 2:
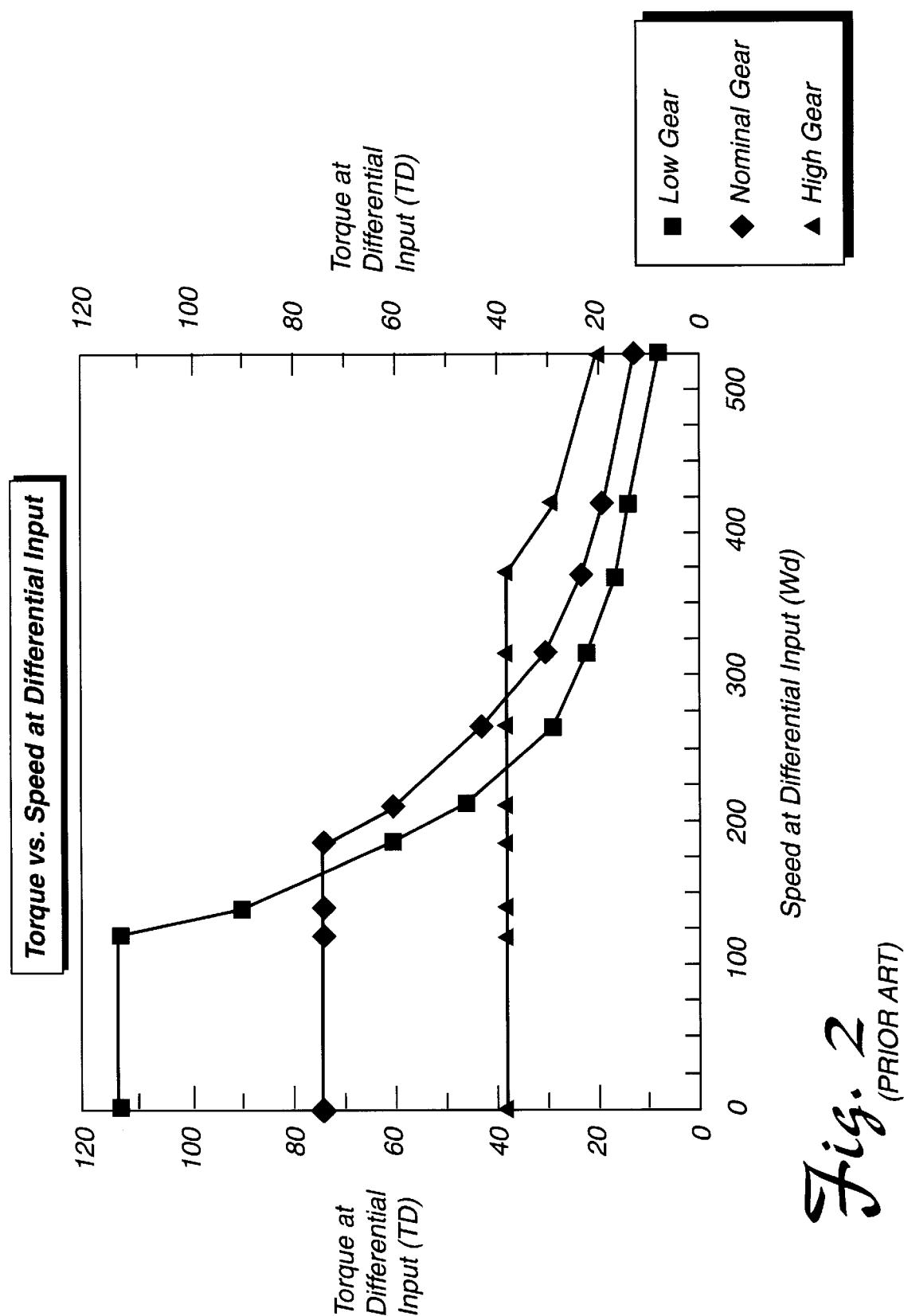
FIG. 2 shows the speed-torque curves for each of the three gears of the conventional electric vehicle drive system.
Figure 3:
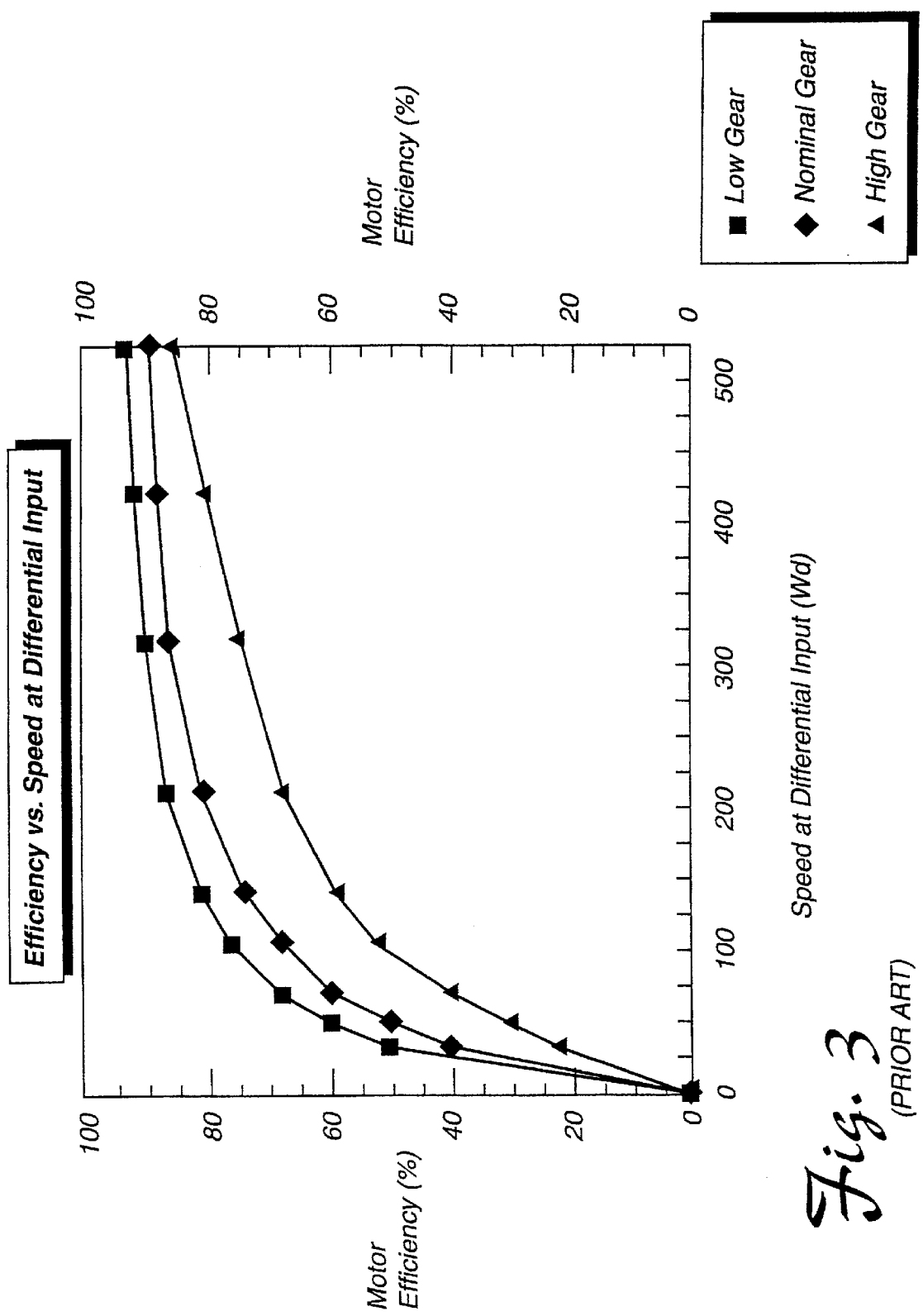
FIG. 3 shows the efficiency curves for each of the three gears of the conventional electric vehicle drive system.
Figure 4:
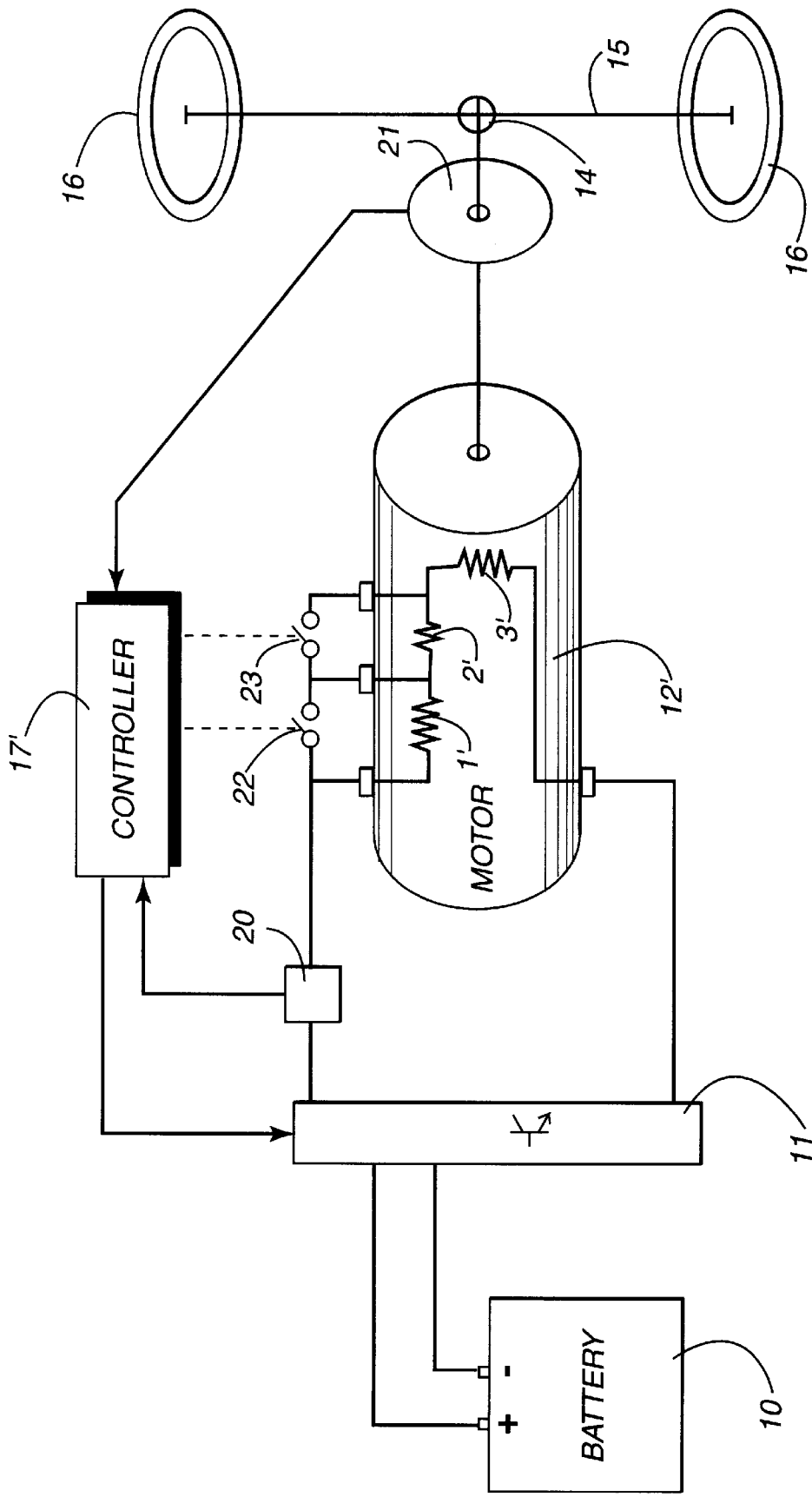
FIG. 4 shows a novel electric vehicle drive system with a series-excited DC motor with integrated transmission.

A system that embodies the present invention is shown in FIG. 4. Its primary elements are battery 10, converter 11, motor 12', differential 14, axle 15, wheels 16 and controller 17'. The motor 12' is comprised of field winding 1', auxiliary field winding 2', and the armature winding 3'. The differences between the system that embodies the present invention and the conventional system shown in FIG. 1 are:

(1) Motor 12' is similar to motor 12 but has the addition of auxiliary field winding 2'.

(2) Switch 22 and switch 23 have been added.

(3) Controller 17' is similar to controller 17 but has the function to appropriately open and close switch 22 and switch 23 instead of the function to control transmission 13. Controller 17' is a custom design that depends on the application and can easily be designed by someone skilled in the art using conventional techniques.

(4) Transmission 13 has been eliminated. The controller 17' senses motor output shaft/differential input speed through tachometer 21 and motor 12' current through current probe 20. With this information controller 17' appropriately controls switch 22 and switch 23 and the converter 11.

The converter 11 transfers electrical power from the battery 10 to the motor 12' at a certain voltage as called for by the controller 17'. The motor 12' converts electrical power into mechanical power according to the voltage applied to its terminals and the status of switch 22 and switch 23. The series-excited DC motor 12' has the characteristic that the field winding 1', auxiliary field winding 2', and armature winding 3 are in series. The battery 10, converter 11, axle 15, wheels 16, controller 17', and switches 22 and 23 are common devices that are understood by those skilled in the art and are therefore not discussed in detail here. The motor 12' is in low gear when switch S1 22 and switch S2 23 are both open, allowing current to flow through both field winding 1' (i.e. first field winding) and auxiliary field winding 2' (i.e. second field winding). The motor is in nominal gear when switch 22 is open and switch 23 is closed, allowing current to flow only through field winding 1'. In this case, auxiliary field winding 2' has no current flowing through it since it is shorted out by switch 23. The motor 12' is in high gear when switch 22 is closed and switch 23 is open, allowing current to flow only in auxiliary field winding 2'. When the controller 17' is requesting a gear change, the reaction time is determined by the electrical time constants of winding 1', winding 2, and winding 3'. The constant parameters of motor 12' are given in Table 4 and, with the exception of the additions of K2 and Rf2, are exactly the same as the constant parameters of motor 12 so that a direct comparison can be drawn. The constant parameters K and Rf are associated with field winding 1'. Likewise, K2 and Rf2 are associated with auxiliary field winding 2'. The variable parameters of the system are the same as those for the conventional system and are listed in Table 2.

TABLE 4

Constant parameters

| Symbol | Name | Value | Units |
| --- | --- | --- | --- |
| K | Torque Constant | 0.00057 | (volt-sec)/(amp-rad) |
| Rf | Field Resistance | 0.014 | ohms |
| K2 | Torque Constant | 0.00029 | (volt-sec)/(amp-rad) |
| Rf2 | Field Resistance | 0.007 | ohms |
| Ra | Armature Resistance | 0.014 | ohms |
| Imax | Maximum Current | 360 | amp |
| Vcc | Battery Voltage | 48 | volts |

The variable parameters for nominal gear are the same as for the conventional motor 12 and are defined in Eqs. 1 through 3. The variable parameters for low gear are defined in Eqs. 10 through 12.

$$V = I*(Rf + Rf2 + Ra) + I*(K + K2)*w \quad (10)$$

$$T = (K + K2)*I*I \quad (11)$$

$$Eff = [100*W*(K + K2)]/[W*(K + K2) + Rf + Rf2 + Ra] \quad (12)$$

The variable parameters for high gear are defined in Eqs. 13 through 15.

$$V = I*(Rf2 + Ra) + I*K2*w \quad (13)$$

$$T = K2*I*I \quad (14)$$

$$Eff = (100*W*K2)/(W*K2 + Rf2 + Ra) \quad (15)$$

For all three gears the differential 14 input speed (Wd) is given in Eq. 16, and the torque delivered to the differential 14 is given in Eq. 17.

$$Wd = W \quad (16)$$

$$Td = T \quad (17)$$

Figure 5:
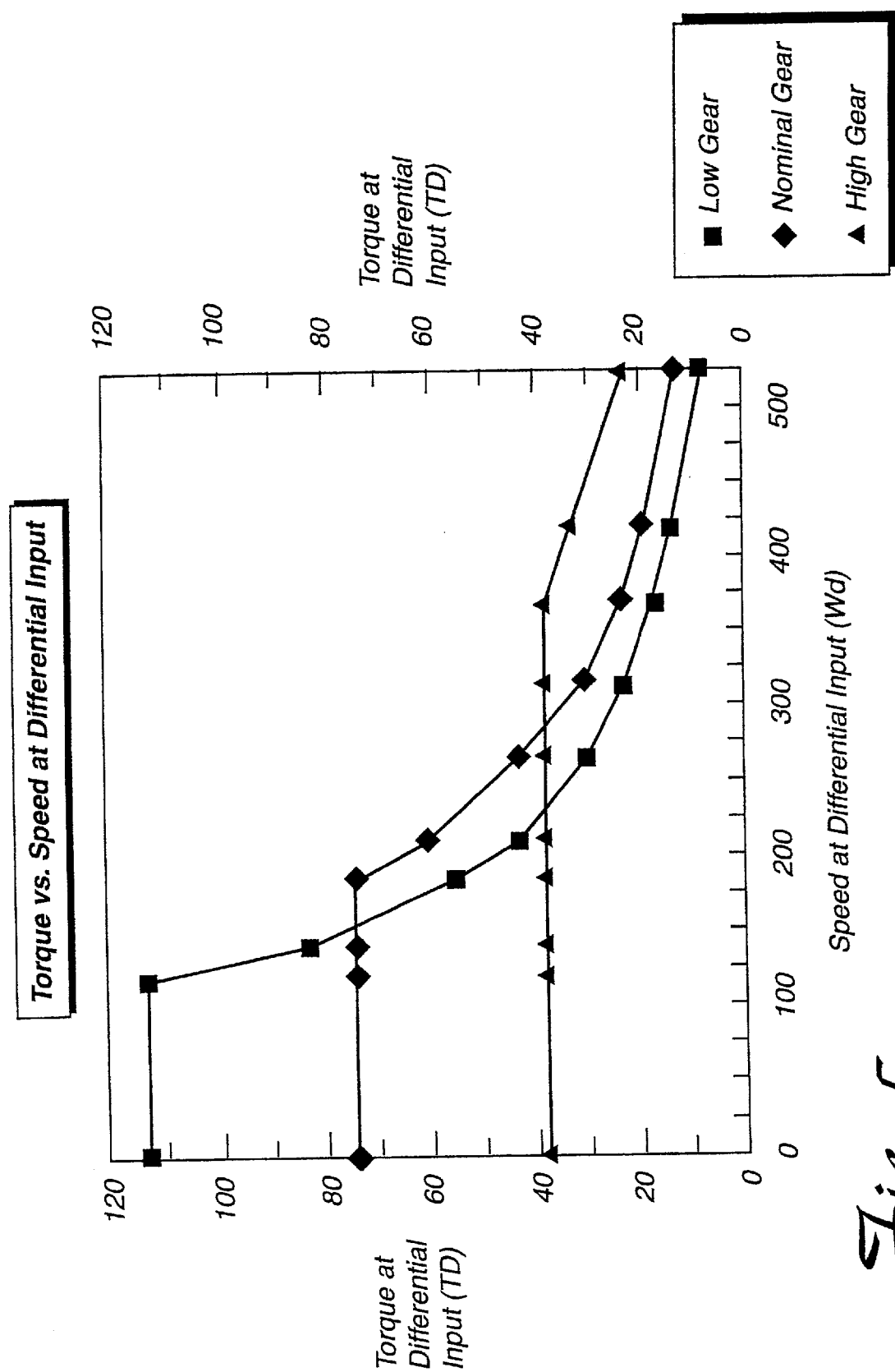
FIG. 5 shows the speed-torque curves for each of the three gears of the novel electric vehicle drive system.
Figure 6:
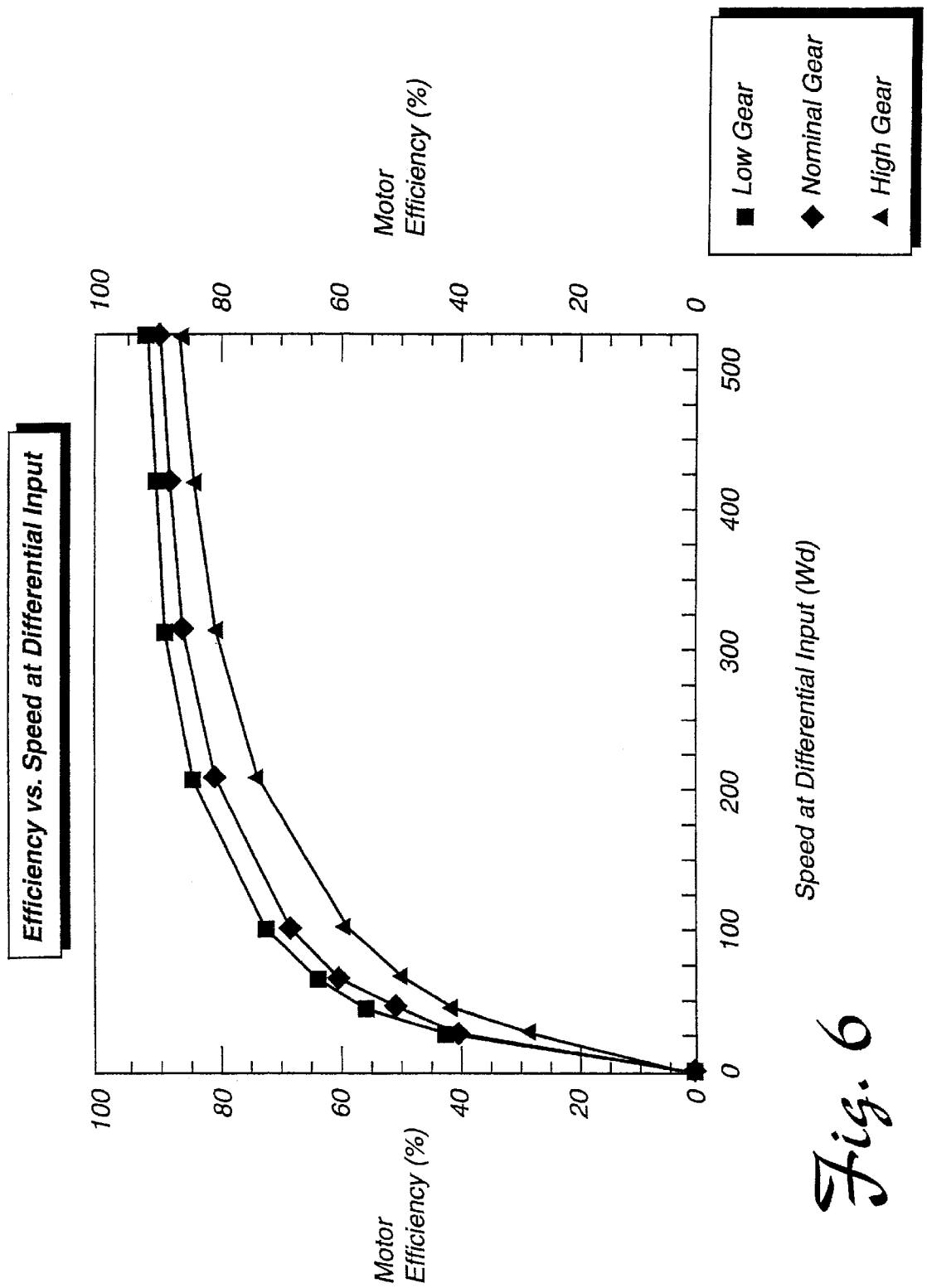
FIG. 6 shows the efficiency curves for each of the three gears of the novel electric vehicle drive system.

With the constant values from Table 4, Eqs. 1 through 3, and Eqs. 10 through 17, the maximum torque (Td) over the speed range of the motor 12' for each of the gears is graphed in FIG. 5, and the efficiency for each gear is graphed in FIG. 6. Notice that the curves are near identical to their respective counterparts in the conventional system with external transmission. Thus the function of a transmission has been successfully integrated into the series-excited DC motor by controlling the number of winding turns employed in the field winding as a function of the speed-torque demand on the motor.

The most important feature of the described series-excited DC motor with integrated transmission is that the function of a transmission has been integrated into the motor by allowing the amount of the field winding used to create the magnetic field to be changed dynamically according to the speed-torque demand on the motor. The novel idea in this invention is that the field winding itself can be increased or decreased as required by the speed-torque demand at any given moment. The importance of this idea is that a lower cost, lighter weight, and smaller drive train can be achieved for electric vehicles.

The theory of operation of the present invention will now be described. At low motor speeds the maximum torque that can be developed by the series-excited DC motor is proportional to the motor's torque constant (K) and is proportional to the square of the system's current rating (Imax), as indicated by Eq. 2.

A designer has three conventional methods to increase the torque delivered to the vehicle at low speeds:

(1) Increase the system's current rating (Imax). This requires increasing the current rating of the battery, converter, and motor. Of course, this will also increase the cost, weight, and size of the battery, converter, and motor.

(2) Select a motor with a higher torque constant (K). This has the disadvantage of decreasing the motor's torque at high speeds.

(3) Use an external transmission so that the motor's speed will be higher than nominal and the torque delivered to the vehicle will be higher than nominal, as Eqs. 4 and 7 reveal. Of course, this has the disadvantage of adding the cost and weight of the transmission to the vehicle.

Similarly, a designer has three conventional methods to increase the torque delivered to the vehicle at high speeds:

(4) Increase the voltage to the motor. This requires raising the voltage of the battery, which will increase its cost, size, and weight. There are also limits to the battery voltage for reliability safety reasons.

(5) Select a motor with a lower torque constant (K). Of course, this has the disadvantage of decreasing the motor's torque at low speeds for a given system current rating (Imax).

(6) Use an external transmission so that the motor's speed can be maintained at a moderate level as the vehicle's speed increases. Of course, this adds the cost and weight of the transmission to the vehicle.

It will be beneficial to discuss why decreasing the torque constant will increase torque at high speeds since this relationship is not intuitively obvious. Examining the combination of Eqs. 1 and 2 as shown in Eq. 18 will gain the reader insight as to why this occurs.

$$T = (K*V*V)/(Rf + Ra + K*W)**2 \quad (18)$$

At high speeds the term K*W is much larger than the term Rf+Ra, and so it dominates the denominator. Equation 18 can now be simplified for high speeds as shown in Eq. 19.

$$T = (V*V)/(K*W*W) \quad (19)$$

Examining Eq. 19 reveals that, as speed (W) increases, the torque (T) can be maintained by decreasing the torque constant (K).

A typical design process will proceed as follows. The designer will select a battery, converter, and motor with a current and voltage rating large enough to produce the required torque over the required speed range. The motor selected will have a nominal value for the torque constant.

The designer will then see if the economics of the system will be improved by adding a transmission and downsizing the voltage and current rating of the battery, converter, and motor. Again, the motor will have a nominal value for the torque constant. In applications such as electric vehicles in which a motor's natural torque performance is not satisfactory over the entire speed range, because of the economic and practical constraints of increasing the system's voltage and current ratings, a designer will often specify a conventional transmission as part of the system.

The present invention breaks the paradigm of having to select a static torque constant for a motor that never changes after the motor is manufactured or installed. Instead, the motor now has a dynamic torque constant that can be varied depending on the speed-torque demand on the motor. Without adding significant cost, weight, or space, the designer can now have a motor with a high torque constant at low speeds and a low torque constant at high speeds.

Accordingly, the reader will see that the series-excited DC motor with integrated transmission does indeed provide for the equivalent function as a conventional motor-transmission set. Furthermore, the series-excited DC motor with integrated transmission has several advantages over the conventional motor-transmission set in that:

(1) The cost of the motor with integrated transmission is much less than the conventional motor-transmission set.

(2) The weight of the motor with integrated transmission is much less than the conventional motor-transmission set.

(3) The physical size of the motor with integrated transmission is much less than the conventional motor-transmission set.

(4) The reliability of the motor with integrated transmission is much greater than the conventional motor-transmission set.

(5) The environment is better served by the motor with integrated transmission since it does not have fluids that require periodic replacement as does the conventional transmission.

(6) The motor with integrated transmission will change gears very quickly and smoothly since the motor will not have to change speeds to change gears as it does with the conventional motor-transmission set.

Although the preceding description contains many specificities, these should not be construed as limiting the scope of the invention, but as merely providing illustrations of some of the currently preferred embodiments of this invention. For example, the motor being controlled could be a brushless DC motor, a shunt DC motor, a compound DC motor, a universal motor, or even an AC motor. Thus the scope of the invention should be determined by the appended claims and their legal equivalents, rather than by the examples given.

What is claimed is:

1. An electric drive system for driving an apparatus, comprising:

a battery;

an electric motor including first and second field windings and an armature winding connected in series;

means for selectively controlling current flow through said first field winding and said second field winding in response to speed-torque demand on said electric motor;

means for selectively controlling the voltage applied to said motor to control the speed of the motor;

a differential for transferring power from said electric motor to the apparatus to be driven; and said electric drive system improving the torque over substantially the entire speed range of said apparatus without use of a transmission.

2. The electric drive system of claim 1, wherein said means for selectively controlling current flow includes a converter for transferring electrical power from said battery to said electric motor.

3. The electric drive system of claim 2, wherein said means for selectively controlling current flow further includes switch means for selectively opening and closing current pathways between said battery and said first field winding and said battery and said second field winding.

4. The electric drive system of claim 3, wherein said means for selectively controlling current flow includes a current probe for monitoring motor current and a tachometer for monitoring motor output shaft speed.

5. The electric drive system of claim 4, wherein said means for selectively controlling current flow includes a controller for controlling operation of said converter and said switch means in response to the motor current and motor output shaft speed sensed, respectively, by said current probe and tachometer.

6. The electric drive system of claim 5, wherein said motor is an AC motor.

7. The electric drive system of claim 5, wherein said motor is a DC motor.

8. The electric drive system of claim 1, wherein said electric motor includes a stator and a rotor and said first and second field windings are carried on said rotor.

9. The electric drive system of claim 1, wherein said electric motor includes a stator and a rotor and said first and second field windings are carried on said stator.

10. An electric motor, comprising:

a first field winding;

a second field winding connected in series with said first field winding;

an output shaft; and a means for controlling current flow through said first and second field windings in response to speed-torque demand on said electric motor to improve the torque over substantially the entire speed range of said apparatus; and a means for controlling the voltage applied to said motor, wherein said voltage control means controls the speed of the motor.

11. The apparatus set forth in claim 10, wherein said means for controlling current flow includes a current probe for monitoring motor current and a tachometer for monitoring output shaft speed.

12. The apparatus set forth in claim 11, wherein said means for controlling current flow includes a converter for transferring electrical power from a power source to said electric motor and switch means for selectively opening and closing current pathways between a power source and said first and second field windings.

13. The apparatus set forth in claim 12, wherein said means for controlling current flow includes a controller for controlling operation of said converter and said switch means in response to motor current and motor output shaft speed sensed, respectively, by said current probe and tachometer.

* * * * *